United States Patent [19]

Breaux et al.

[11] Patent Number: 4,729,150
[45] Date of Patent: Mar. 8, 1988

[54] FISH SKINNING, SCALING AND DRESSING DEVICE

[76] Inventors: Roddy P. Breaux; Connie C. Breaux, both of P.O. Box 59, Gheens, La. 70355

[21] Appl. No.: 924,220

[22] Filed: Oct. 28, 1986

[51] Int. Cl.⁴ .............................................. A22C 25/14
[52] U.S. Cl. ............................................. 17/68; 17/69
[58] Field of Search .................. 17/68, 69, 62, 66, 70

[56] References Cited

U.S. PATENT DOCUMENTS

| 752,118 | 2/1904 | Stearns | 17/68 |
|---|---|---|---|
| 1,459,007 | 6/1923 | Wetzig | 17/68 |
| 3,088,165 | 5/1963 | Bellis | 17/68 |
| 3,771,197 | 11/1973 | Heuer, Sr. | 17/68 |

Primary Examiner—Willie G. Abercrombie
Attorney, Agent, or Firm—George A. Bode

[57] ABSTRACT

A fish skinning, scaling and dressing device comprising a pair of elongated arms pivotally connected intermediate the ends thereof, a pair of opposed coacting arcuate jaws integral with the pivotally connected ends of the arms, a plurality of spaced projections extending outwardly from the convex surface of the first one of the jaws, a cutting blade pivotally connected with the arms and depending outwardly from and being perpendicularly disposed from the convex surface of the second one of the jaws, and a pair of retaining members depending from the convex surface of the second one of the jaws and being disposed on either side of the cutting blade for preventing lateral movement and retaining the blade in a perpendicular disposition from the convex surface of the second jaw.

18 Claims, 7 Drawing Figures

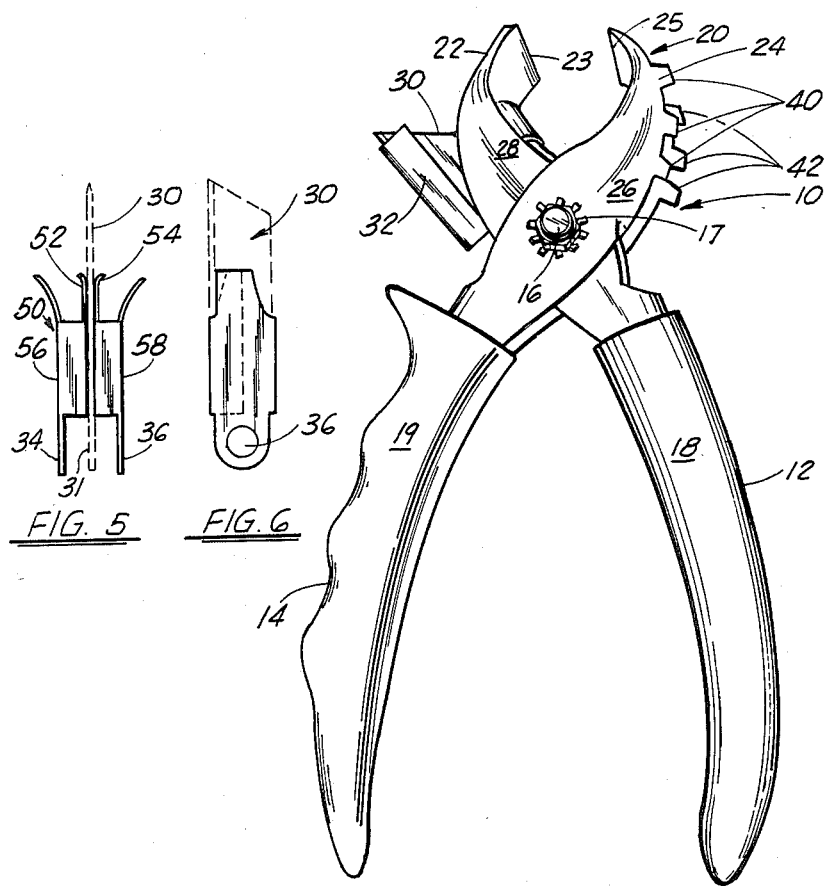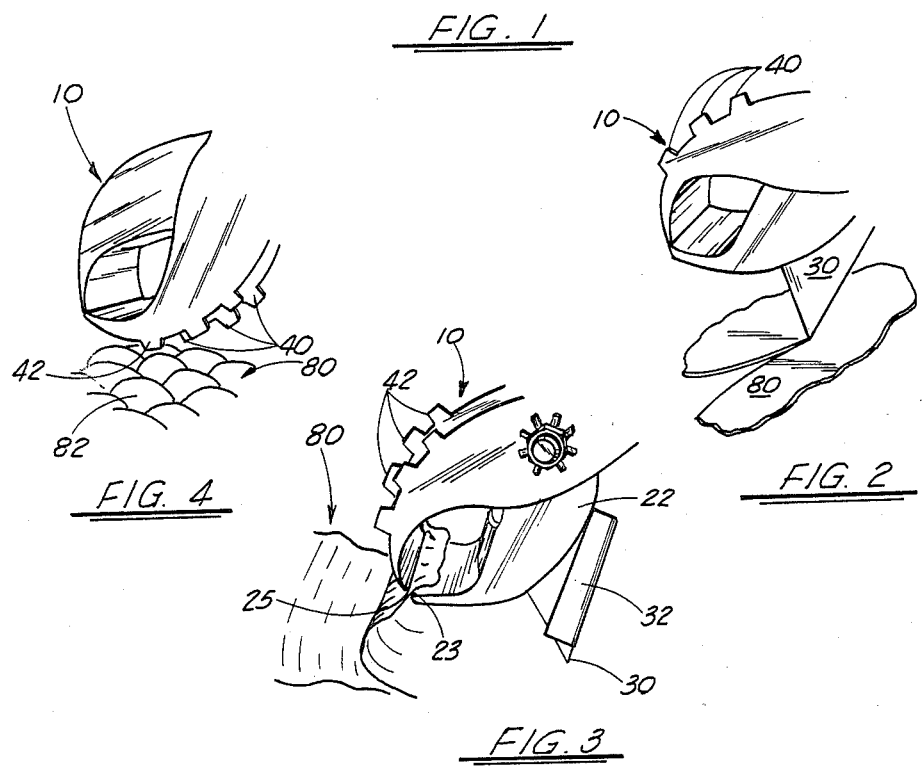

FISH SKINNING, SCALING AND DRESSING DEVICE

BACKGROUND OF THE INVENTION

1. Field of the Invention

This invention relates to new and useful improvements in fish skinning, scaling and dressing tools, and more particularly to such a tool which is the combination of a cutter, scaler and a gripping member for grasping the skin of the fish.

2. General Background

Cleaning and dressing of fish is always a difficult task. Sadly enough, until now, this has been even more difficult a task than was necessary due to the lack of a tool which combined the capacity for cutting, scaling, and skinning in one instrument.

In the art of fish skinning, two operations are required. First the skin must be loosened by cutting with a sharp bladed instrument; then, the skin must be removed by gripping the loosened end of the skin with a pincer or plier type tool or gripping member.

In the art of fish scaling the scales are removed by scraping off the scales by drawing a scaler over the body of the fish. Dressing also involves the use of a sharp bladed instrument for cutting.

Whether commercially or for sport, the fisherman is usually faced with the task of cleaning a catch made up of both fish having an outer covering of skin and fish having and outer covering of scales. Consequently, a person engaged in these operations will pick-up and lay down respective cutting, skinning, and scaling tools time after time. This is time consuming and inefficient.

Various attempts have been made to fill the need for such a device. For example, U.S. Pat. No. 2,720,001 issued to Hobson; U.S. Pat. No. 2,654,120 issued to Tifft; U.S. Pat. No. 3,088,165 issued to Bellis; U.S. Pat. No. 3,771,197 issued to Heuer; and U.S. Pat. No. 4,483,048 issued to Jackson.

Although these patents have attempted to fill this need, until now there has been no device which has been completely successful in combining the operation of cutting, scaling, and skinning in such a way that any of these operations can be performed in any sequence without changing the operator's grip on the device.

Accordingly, there appears to be a longstanding need for an improved combination which will overcome the aforementioned problems.

GENERAL DISCUSSION OF THE PRESENT INVENTION

The present invention relates to new and useful improvements in fish skinning, scaling, and dressing tools. This invention has, as its primary objective as set forth hereinafter, the skinning, scaling, and dressing of different types of fish, which are included in almost any catch, with a maximum of efficiency and a minimum of effort.

Another important object of the present invention is to provide a single combination device which is designed to perform the functions of several separate devices, thereby avoiding the time loss of repeatedly changing tools and avoiding the inherent difficulties therein.

Still another important object of the present invention is to provide in one tool, without the necessity of modifying the tool in any way between operations, the capacity to both scale fish and skin fish, thereby eliminating the need to pre-sort the fish that have skin and the fish that have scales, thereby increasing the efficiency of the process.

A further important object of the present invention is to provide a single tool which has the capacity for scaling, skinning, and cutting in which it is not necessary for the operator to change his grip in going from one operation to another during the cutting, scaling or skinning process.

Still another object of the present invention is to provide a tool for these purposes which is safe to use, durable, and yet easily and inexpensively manufactured.

Other objects, advantages, and novel features will become apparent from the following detailed description and drawing.

BRIEF DESCRIPTION OF THE DRAWINGS

For a further understanding of the nature and objects of the present invention, reference should be had to the following detailed description, taken in conjunction with the accompanying drawing, in which like parts are given like reference numerals and, wherein:

FIG. 1 is a perspective of the device of the present invention;

FIG. 2 is a view of the cutting blade of the device of the present invention being utilized in cutting the skin of a fish;

FIG. 3 is a view of the jaws of the device of the present invention grasping the skin of the fish for skinning;

FIG. 4 is a view of the device of the present invention being utilized to remove the scales of a fish;

FIG. 5 is an end view of the cutting blade (in phantom) of the device of the present invention mounted in its support;

FIG. 6 is a side view of the cutting blade of FIG. 5; and

DETAILED DESCRIPTION OF THE PREFERRED EMBODIMENT

Figure 7:
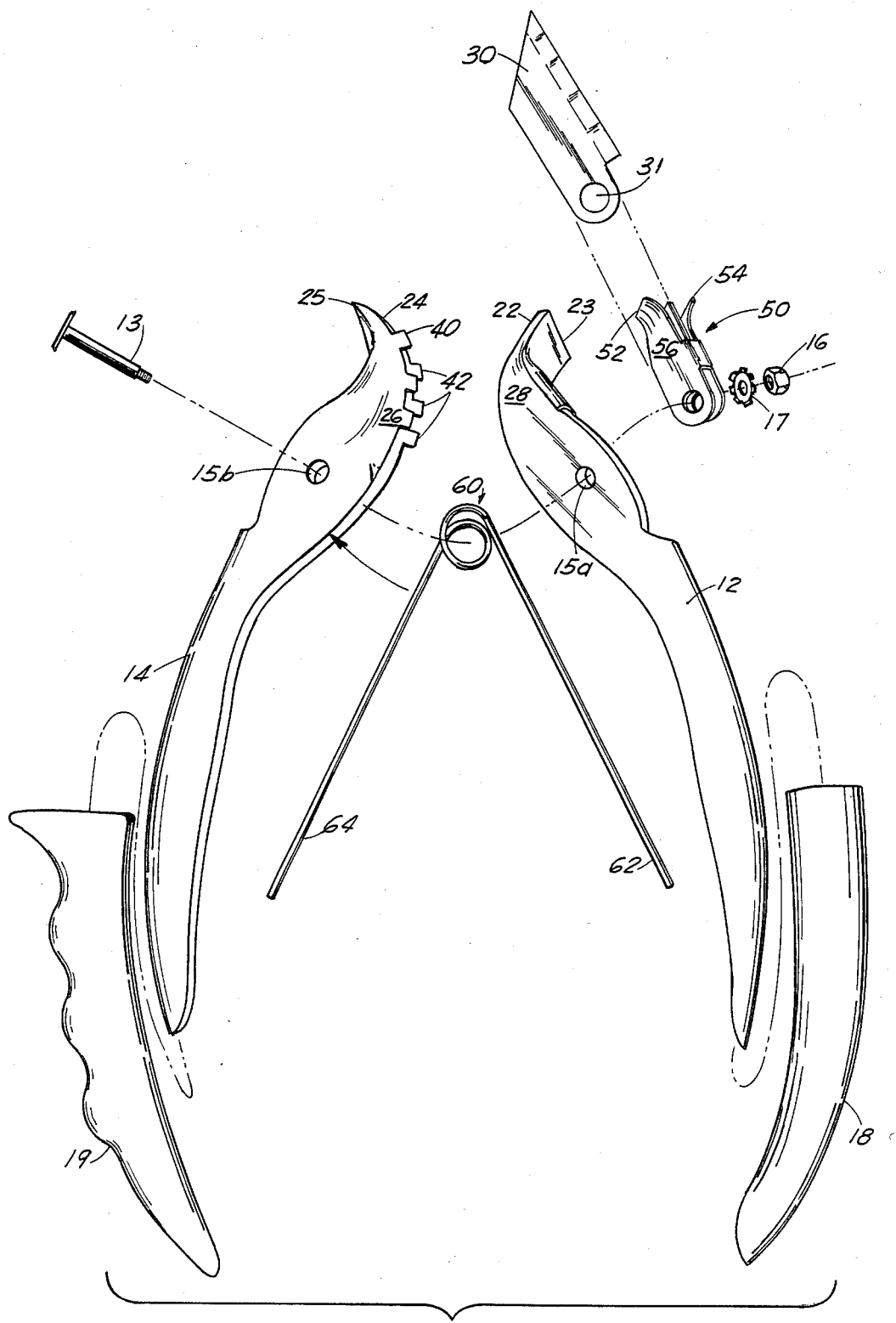
FIG. 7 is an exploded view of the device of FIG. 1.

Referring to the drawing, and more particularly to FIGS. 1 and 7, our combination fish skinner, scaler, and cutter knife designated generally by the numeral 10 is shown to have a first arm 12 and a second arm 14, which are pivotally secured together by means of a pin 13 passing through apertures 15a, 15b respectively therein and conventional screw fastener 16 and its washer 17. Arm 12 terminates at its distal end in first jaw 22 and arm 14 terminates at its distal end in second jaw 24 oppositely opposed to jaw 22. Jaws 22 and 24 are used to grippingly engage by teeth 23, 25 respectively the skin of a fish 80 in the skinning operation.

A conventional "A" shaped helical spring 60 encircles screw fastener 16, and has one end 62 engaged with arm 12 and the other end 64 engaged with arm 14 to bias the jaws 22, 24 to the open position of FIG. 1.

On the convex surface 26 of jaw 24 there are two rows of projections, first row of projections 40 and second row of projections 42, which are used in removing the scales 82 of fish 80, as best seen in FIG. 4.

Depending outwardly from the convex surface 28 of first jaw 22 is a cutting blade 30, pivotally mounted to pin 13 through aperture 31 in blade 30 and apertures 34, 36 in blade support 50. As best seen in FIGS. 1 and 3, blade 30 is held steady in the vertical position during cutting operations by abutment with inside convex surface 28 of jaw 22. As best seen in FIGS. 5 and 6, blade 30 is held steady in the lateral position during cutting operations by tensioning between first and second retaining members 52, 54 of support member 50 integrally formed with (or spot welded to) jaw 22 at sides 56, 58. A slidably removable sheath 32 is provided for covering the cutting blade 30 when it is not in use.

Covers 18, 19 encompass the handle portion of the arms 12, 14 respectively for providing a more secure grip. In the preferred embodiment covers 18, 19 are of a hard plastic and are a molded to arms 12, 14 and either of the covers (cover 19 is illustrated in the drawing) is formed to fit the grip of the hand.

In operation, a fish 80 to be skinned is laid flat against a flat surface. Grasping the head of fish 80 with one hand, and device 10 with the other, an incision is made with cutting blade 30, as best seen in FIG. 2, downward from the top dorsal fin to the bottom side fin, and also along the top side fin to the rear end thereof. As best seen in FIG. 3, the teeth 23, 25 of jaws 22, 24 repectively are then used to grip the cut edge of skin which is then pulled downward towards the back end of the fish 80. As best seen in FIG. 4, in scaling, the head of fish 80 is grasped with one hand and device 10 with the other, and projections 40, 42 are drawn across the body of fish 80 thereby removing scales 82. Because there are two rows of projections 40, 42 separated by the approximate width of the arms 12, 14, the scaling operation is more efficient. Because the rows of projections 40, 42 are not parallel, but are divergent from the direction of the handle 14 toward the jaw 24, scales 82 removed from fish 80 tend to be removed from the two rows of projections 40, 42 by the normal motion of the scaler across the body of the fish 80. After skinning or scaling the cutting blade 30 is used in a manner well known to those skilled in the art to complete dressing of the fish.

Obviously many modifications and variations of our invention are possible in light of the above teachings; further, since many modifications and variations will readily occur to those skilled in the art, it is not desired to limit the invention to the exact construction and operation shown and described and accordingly all suitable modifications and equivalents may be resorted to, as falling within the scope of the invention as claimed.

What is claimed as invention is:

1. A fish skinning, scaling, and dressing device, comprising:
   a. a pair of elongated arms pivotally connected intermediate the ends thereof;
   b. an arcuate jaw integral with said pivotally connected end of each of said arms, said jaws matingly engaging in the closed position of said jaws;
   c. a plurality of spaced apart projections extending outwardly from the convex surface of the first one of said jaws; and
   d. a cutting blade depending outwardly from and being perpendicularly disposed from the convex surface of said second jaw.

2. The fish skinning, scaling, and dressing device as defined in claim 1, further comprising means for biasing said jaws to their open position having one end engaged with said first arm and the opposite end engaged with said second arm.

3. The fish skinning, scaling, and dressing device as defined in claim 1, wherein said plurality of spaced projections extending outwardly from said convex surface of said first jaw are provided in non-parallel rows.

4. The fish skinning, scaling, and dressing device as defined in claim 1, further comprising a pin and screw fastener for pivotally connecting said pair of elongated arms.

5. The fish skinning, scaling, and dressing device as defined in claim 1, further comprising a slidable sheath for removably covering said cutting blade.

6. The fish skinning, scaling, and dressing device as defined in claim 1, further comprising means for gripping said arms.

7. The fish skinning, scaling, and dressing device as defined in claim 6, wherein one of said gripping means is formed to the shape of a hand.

8. A fish skinning, scaling, and dressing device, comprising:
   a. a pair of elongated arms pivotally connected intermediate the ends thereof;
   b. an arcuate jaw integral with said pivotally connected end of each of said arms, said jaws matingly engaging in the closed position of said jaws;
   c. a plurality of spaced apart projections extending outwardly from the convex surface of the first one of said jaws; and
   d. a cutting blade pivotally connected with said arms and depending outwardly from and being perpendicularly disposed from the convex surface of said second jaw.

9. The fish skinning, scaling, and dressing device as defined in claim 8, further comprising means for biasing said jaws to the open position having one end engaged with said first arm and the opposite end engaged with said second arm.

10. The fish skinning, scaling, and dressing device as defined in claim 8, wherein said plurality of spaced apart projections extending outward from said convex surface of said first one of said jaws are provided in non-parallel rows.

11. The fish skinning, scaling, and dressing device as defined in claim 8, further comprising a pin and screw fastener for pivotally connecting said pair of elongated arms.

12. The fish skinning, scaling, and dressing device as defined in claim 8, further comprising a slidable sheath for removably covering said cutting blade.

13. The fish skinning, scaling, and dressing device as defined in claim 8, further comprising means for gripping said arms.

14. The fish skinning, scaling, and dressing device as defined in claim 13, wherein one of said gripping means is formed to the shape of a hand.

15. A fish skinning, scaling, and dressing device comprising:
   a. a pair of elongated arms pivotally connected intermediate the ends thereof;
   b. an arcuate jaw integral with said pivotally connected ends of each of said arms, said jaws matingly engaging in the closed position of said jaws;
   c. a plurality of spaced apart projections, provided in non-parallel rows extending outwardly from the convex surface of said first one of said jaws;
   d. a cutting blade pivotally connected with said arms and depending outwardly from and being perpendicularly disposed from the convex surface of said second jaw;
   e. a pair of retaining members depending from the convex surface of said second jaw and being disposed on either side of said cutting blade for preventing lateral movement and retaining said blade in a perpendicular disposition from the convex surface of said second jaw; and, f. means for biasing said jaws to the open position having one end engaged with said first arm and the opposite end engaged with said second arm.

16. The fish skinning, scaling, and dressing device as defined in claim 15, further comprising a pin and screw fastener for pivotally connecting said elongated arms.

17. The fish skinning, scaling, and dressing device as defined in claim 15, further comprising a slidable sheath for removably covering said cutting blade.

18. The fish skinning, scaling, and dressing device as defined in claim 15, further comprising means for gripping said arms, one of said gripping means being formed to the shape of a hand.

* * * * *